United States Patent
Paulus et al.

[11] 3,934,385
[45] Jan. 27, 1976

[54] EDGE TRIM

[75] Inventors: Peter V. Paulus, Ypsilanti, Mich.; Aaron J. Ungerer, Niskayuma, N.Y.

[73] Assignee: The Standard Products Co., Cleveland, Ohio

[22] Filed: Apr. 22, 1974

[21] Appl. No.: 462,623

[52] U.S. Cl. ................... 52/717; 52/716; 161/100; 52/631
[51] Int. Cl.² ......................................... E04C 2/33
[58] Field of Search ............ 52/716, 717, 624, 627, 52/631, 573, 399, 220, 730, 753 B, 753 H; 161/67, 100, 103, 105, 106

[56] References Cited
UNITED STATES PATENTS

| | | | |
|---|---|---|---|
| 1,919,130 | 7/1933 | Reid | 161/103 |
| 2,313,419 | 3/1943 | Bush | 161/106 |
| 2,794,757 | 6/1957 | Bright | 161/100 |
| 2,823,701 | 2/1958 | Burk | 52/220 |
| 2,954,310 | 9/1960 | Truesdell | 161/100 |
| 3,091,821 | 6/1963 | Cook | 161/106 |
| 3,172,800 | 3/1965 | Trussdell | 161/100 |
| 3,200,448 | 8/1965 | Bright | 161/100 |
| 3,222,769 | 12/1965 | LePlae | 52/716 |
| 3,590,768 | 7/1971 | Shanok | 52/716 |
| 3,706,173 | 12/1972 | Taylor | 52/631 |

FOREIGN PATENTS OR APPLICATIONS

| | | | |
|---|---|---|---|
| 561,610 | 5/1960 | Belgium | 52/716 |
| 1,044,475 | 9/1966 | United Kingdom | 52/716 |
| 1,260,826 | 4/1961 | France | 52/718 |
| 798,303 | 7/1958 | United Kingdom | 52/716 |

Primary Examiner—Ernest R. Purser
Assistant Examiner—Robert Farber
Attorney, Agent, or Firm—Harness, Dickey & Pierce

[57] ABSTRACT

A trim strip of U-section for a marginal edge of an automotive body panel or the like comprises a flexible but relatively stiff core member of U-section formed of metal and having a plurality of longitudinally spaced transverse slots to permit the strip to deform in conformance to the contour of the panel edge. A flexible plastic decorative covering is secured to the core in overlying relation but is outspaced therefrom except along oppositely spaced marginal edges. In a modification a core member of wire mesh is used.

2 Claims, 8 Drawing Figures

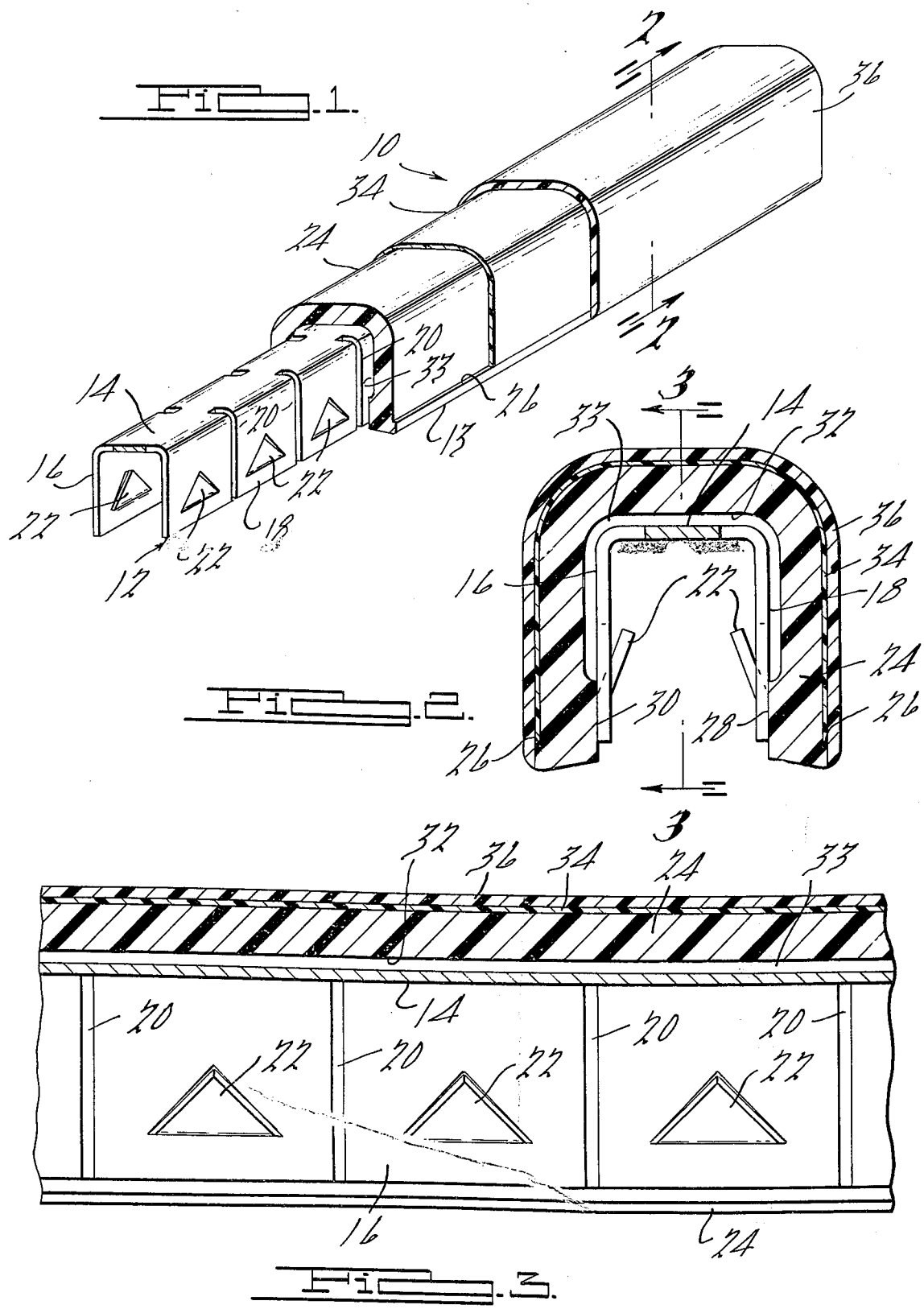

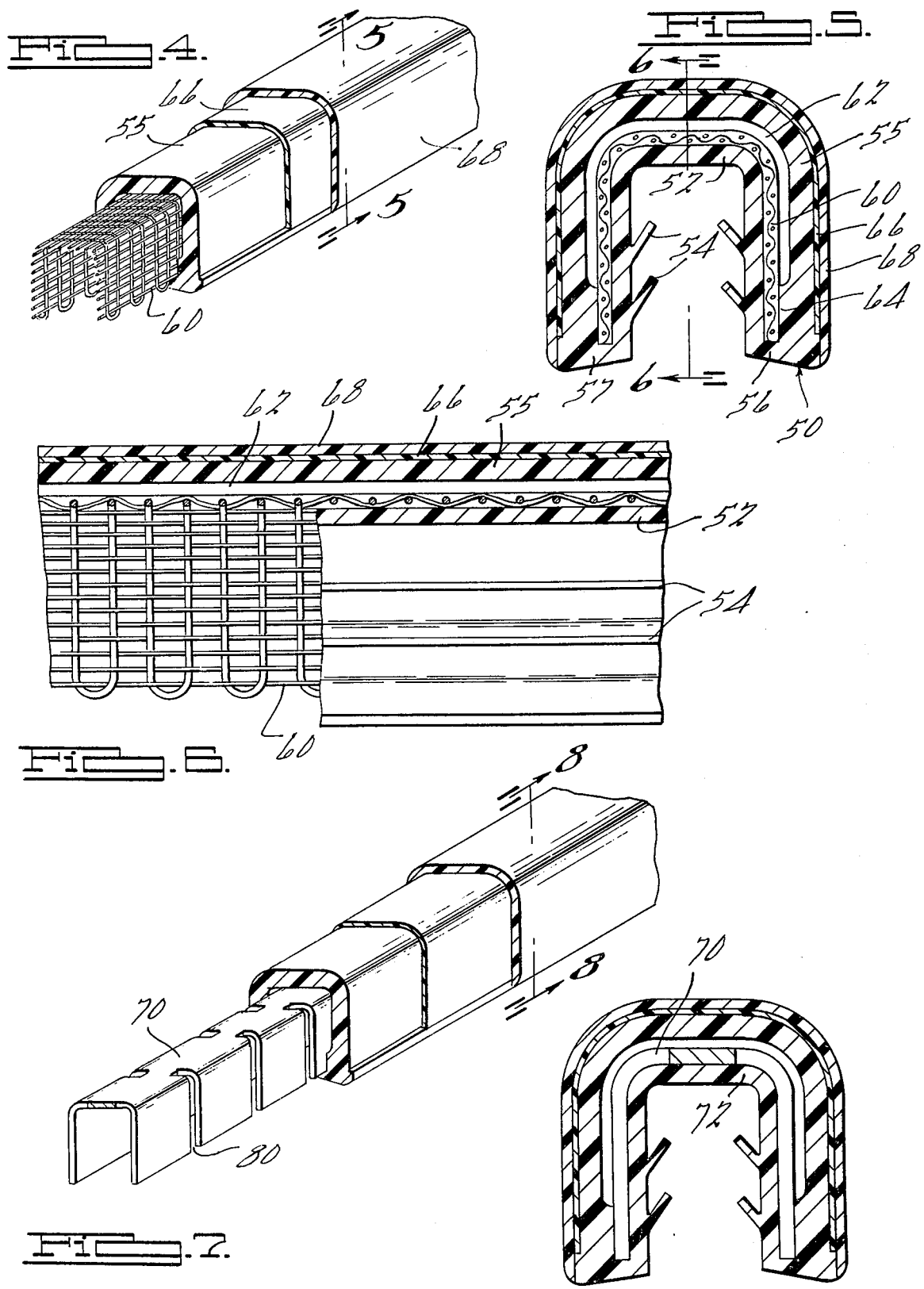

EDGE TRIM

BACKGROUND OF THE INVENTION

The present invention relates generally to the art of decorative trim strips and more particularly to a strip adapted to be conformingly self-connected along the marginal edges of automotive body panels or the like whereby to protect the edge against abrasions, scratches, pits and the like.

Trim strips of various constructions have heretofore been provided for installation relative to a marginal edge of sheet or panel sections and the like for the dual purpose of protecting the edge and for a decorative effect. In a typical construction for such strips, a relatively stiff but resilient core of U-section shaped to embrace and retain itself by friction on the edge of the panel is formed to a desired cross-sectional shape whereby to compressively overengage the marginal edge of the panel. A decorative moulding or cover is normally carried by the core and is generally provided with a bright lustrous appearance to augment the aesthetics of the vehicle. The decorative effect of the trim strip can be achieved in a number of different ways and may be accomplished merely by embossing the exterior surface of the strip during production. One decorative effect which has been used extensively is accomplished by adhering a film of metalized plastic to an exposed outer surface of an elastomeric moulding carried by the core or body. A transparent coating can be located over the film whereby the metalized plastic is visible therethrough and gives the trim strip the appearance of chrome.

In the production of edge trim strips, the body or core portion is generally formed of metal and U-shaped to accommodate reception of the marginal edge of the panel. To permit the core to be deformed in conformance with the shape of the marginal edge, the integrity thereof is weakened by the provision of a plurality of longitudinally spaced slots or notches. In the current practice it has been common to apply the decorative covering directly to the outer surface of the core portion in closely overlying relationship. Due to the fact that the strip bends primarily at the slots, undesirable characteristics in the appearance of the trim strip when the strip is conformingly bent in accordance to the shape of the marginal edge have been caused by the fact that the core will generally bend in a plurality of small, generally flat segments relative to an arcuately shaped edge portion of the panel. By virtue of its direct connection with the core, the covering will also assume the same configuration consisting of a series of flats rather than a smooth arcuate shape. Other defects or irregularities of the core are also apt to be visible in the exterior surface of the decorative cover and can result in a substantial quantity of strip produced being unacceptable for use.

In accordance with the present invention, an edge trim structure of the character described hereinabove is provided wherein the appearance of uneven surface contours including the aforementioned flats along an arcuately shaped contour of the marginal edge is minimized or eliminated. More particularly, and in conformance with one aspect of the present invention, an elastomeric moulding or cover carrying the decorative material is bonded to the metal core or body of the trim strip solely along marginal edge portions so that the intermediate portion therebetween is substantially independent of the core. This advantageously permits the mounding and decorative material thereof to float or in other words, assume its own contour relative to the marginal edge of the body panel whereby the tendency of the outer surface of the core underlying the moulding to distort the shape of the moulding or be visually discernible is substantially eliminated.

Other objects, features and advantages of the present invention will become apparent from the subsequent description and the appended claims, taken in conjunction with the accompanying drawing.

BRIEF DESCRIPTION OF THE FIGURES OF DRAWING

FIG. 1 is a fragmentary perspective view with portions broken away of an edge trim strip in accordance with a preferred embodiment of the present invention;

FIG. 2 is a transverse cross-section of the edge trim strip illustrated in FIG. 1 taken on the line 2—2 thereof;

FIG. 3 is a longitudinal sectional view taken on the line 3—3 of FIG. 2;

FIG. 4 is a perspective view similar to FIG. 1 showing a modified construction;

FIG. 5 is a cross section taken on the line 5—5 of FIG. 4;

FIG. 6 is a longitudinal section taken substantially on the line 6—6 of FIG. 5 and looking in the direction of the arrows, partly broken away;

FIG. 7 is a view similar to FIG. 1 showing another modification; and

FIG. 8 is a cross section taken on the line 8—8 of FIG. 7.

DETAILED DESCRIPTION OF PREFERRED FORMS OF THE INVENTION

With reference now to FIG. 1 of the drawing, a trim strip for a marginal edge of a panel in accordance with a preferred embodiment of the present invention is indicated generally at 10. The strip 10 comprises a generally U-shaped body or core member 12 adapted to be self-connected to the marginal edge of the panel and a decorative moulding 13 of generally laminated construction carried by the member 12. The member 12 is preferably fabricated from a non-corrosive metal such as stainless steel and includes a laterally extending base or bight section 14 and spaced side walls 16, 18.

As best seen in FIGS. 2 and 3, each of the side walls 16 and 18 include a plurality of longitudinally spaced, laterally extending slits or incisions 20 which extend at least partially into the base section 14 which function to reduce the inherent structural integrity or strength of the core 12 whereby the trim strip 10 is sufficiently flexible to accommodate the contour or shape of the marginal edge of the panel whereto the strip is to be connected. Each of the side walls 16 and 18 also include a plurality of longitudinally spaced, triangular shaped, lanced finger means 22 which are, respectively, inclined inwardly relative to the plane of the inner surface thereof and which are adapted to compressively retain the strip 10 in a substantially fixed position along the marginal edge of the panel. More particularly, the trim strip 10 is installed by slidably overfitting the core 12 upon the marginal edge of a panel. In response to the slidable installation of the strip 10, the fingers 22 are deflected outwardly resulting in a compressive bias adapted to fixedly self-connect the strip 10 to the panel. The sharp-edged apex defined at the upper edge of the fingers 22 is adapted to resist removal of the trim strip 10 once it has been installed, it being appreciated that the strip is readily slidable to cooperatively receive the marginal edge of the panel but virtually locked in place by the apex of the fingers 22 once the strip is fully seated relative to the panel edge.

Except along the free ends of the sidewalls, the moulding 13 is disposed in substantially spaced overlying relationship relative to the outer surface of the core 12 and is bondingly connected thereto solely along the lower marginal edges of each of the side walls 16 and 18. In this regard, it will be seen that the moulding 13 comprises a generally U-shaped support section indicated generally at 24 formed of a suitable flexible plastic and having an enlarged inner surface 32 defining a U-shaped space 33 between wall 24 and core 12. The lower wall portions of the section 24 include inwardly, laterally extending flanges 28 and 30 which are adapted to be bondingly or otherwise connected along the lower edge of the walls 16 and 18 of the core 12. Each of the opposite laterally spaced side walls of the section 24 project slightly below the marginal edge portion of the core 12 whereby the core 12 is virtually totally concealed after installation on the panel edge. The outer surface of the section 24 includes a pair of longitudinally extending, inwardly spaced shoulders 26 which form a seat adapted to cooperatively receive and locate opposite marginal edges of a metal film or foil indicated at 34, the latter being preferably adapted to provide a bright lustrous appearance to enhance the aesthetics of the trim strip 10. Preferably, the film or foil 34 is formed by a vacuum metalized polyester having a thickness in the magnitude of 0.0005 inches. To protect the metal film 34 from surface abrasions, nicks, gouges, scratches, pits and the like, a clear transparent coating 36 is disposed about the outer surface of the film 34 and in a preferred construction of the strip 10, the coating is formed by a polyvinyl chloride composition in conformance with ASTM Standard D-2287.

In the modified construction shown in FIGS. 4–6 a plastic body generally designated 50 is formed of a relatively stiff but bendable plastic, and is extruded in the shape best shown in cross section in FIG. 5, to include an inner U-shaped wall structure 52 corresponding in position and general conformation to the reinforcing core 12 of the first embodiment but having continuous longitudinally extending finger-like ribs 54 in place of the teeth 22. Ribs 54 are inclined inwardly and adapted to frictionally engage opposite sides of a panel to which the assembly is applied. An outer wall portion 55 of similar shape to but larger than the wall 52 is molded integrally with wall 52 and is outspaced therefrom except at the free edges where it is joined to the wall 52 by integral connecting portions 56, 57. A wire mesh reinforcing core 60 of conforming U-shape is fitted in the space between the inner and outer walls 52, 55, fitting snugly on the inner wall 52. A free space 62 is left between the mesh and the outer wall 55, corresponding to the space 53 of the first-described embodiment. The base portions of the free edges of the mesh are gripped between wall 52 and the closer fitting portions 64 of the outer wall 55. The outer wall 55 is illustrated as carrying a decorative coating consisting of a metalized layer 66 and a transparent protective plastic coating 68.

The wire mesh 60 is loosely woven of easily-bendable wire, and may be either slid into place, or molded in place. Although when the assembly is bent the mesh tends to ripple and distort, such distortions are not visible on the outside, because they are accommodated within the space 62.

The further modification shown in FIGS. 7 and 8 is similar to the embodiment of FIGS. 4–6, except that the core reinforcing mesh member 60 of the last-described embodiment is replaced by a core member 70 of sheet metal, provided with slots 80 corresponding to the slots 20 of the first embodiment to permit ready bending. In all embodiments material of the core reinforcing member is sufficiently resilient, and the side webs are tensioned inwardly so as to cause the assembly to tightly grip a panel upon which it is overfitted. In the embodiments of FIGS. 4–8, however, the inner walls 52, 72 serve to protect the panel surface against marring so that no metal directly engages the panel. In effect the core structure in these embodiments consists of the inner wall 52 or 72 and the core reinforcing member 60 or 70. Other features of both of these embodiments will be seen to correspond to features previously described, so that detailed redescription thereof will not be required.

It will be seen that the outer decorative portion of the trim strip is permitted to virtually float relative to the core structure, whereby the strip will smoothly conform to various arcuately shaped sections formed on the marginal panel to which it is mounted. Connection of the support section to the core solely along the marginal edges thereof permits the support section and decorative material to assume their own independent contour relative to the core.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A bendable trim strip of U-section adapted to embrace and to be self-connectably located on the edge of a panel or the like comprising a U-sectioned elongated relatively flexible stiffening core formed of metal and which when bent tends to form relatively minor superficial irregularities, an elongated U-sectioned decorative covering carried by and embracing the exterior of and bendable with said core and continuously secured thereto along transversely spaced longitudinally extending narrow marginal areas located at the free edges of the legs of the U-sectioned core and covering, all portions of said covering except in said secured marginal areas being outspaced from the core throughout the entire effective length of said core and covering to define an uninterrupted longitudinal space of U-shaped cross section between the core and covering, whereby irregularities of the core are spaced from and do not affect the contour of the outspaced portion of the covering.

2. A trim strip of U-section adapted to embrace the edge of a panel, comprising a U-sectioned elongated flexible plastic inner body portion, a U-sectioned elongated bendable metallic stiffening core embracing the exterior of said inner body portion, and a U-sectioned elongated flexible plastic outer body portion extending around both side webs and the bight portion of the stiffening core and continuously secured to the free edges of the side webs of the core, said outer body portion, except in the edge areas close to said free edges, being spaced from the core to define an uninterrupted longitudinal spacing of U-shaped cross section between the stiffening core and the outer body throughout the entire length of the outer body and extending around and along the major proportion of the total cross sectional area of the bight and side web portions thereof.

* * * * *